United States Patent
Kemp et al.

(10) Patent No.: US 7,540,543 B2
(45) Date of Patent: Jun. 2, 2009

(54) FRONT BUMPER ENERGY ABSORBER WITH INTEGRATED DEBRIS GRILLE

(75) Inventors: Ronald S. Kemp, Oxford, MI (US); Ronald A. Wehner, Waterford, MI (US)

(73) Assignee: Chrysler LLC, Auburn Hills, MI (US)

( * ) Notice: Subject to any disclaimer, the term of this patent is extended or adjusted under 35 U.S.C. 154(b) by 383 days.

(21) Appl. No.: 11/389,916

(22) Filed: Mar. 27, 2006

(65) Prior Publication Data

US 2007/0222237 A1   Sep. 27, 2007

(51) Int. Cl.
*B60R 19/16* (2006.01)
(52) U.S. Cl. .................................. 293/112
(58) Field of Classification Search ............ 296/187.03, 296/187.09, 193.09, 193.1; 293/112, 132
See application file for complete search history.

(56) References Cited

U.S. PATENT DOCUMENTS

| | | | | |
|---|---|---|---|---|
| 3,926,463 A | * | 12/1975 | Landwehr et al. | 293/136 |
| 4,406,489 A | * | 9/1983 | Trabert | 293/115 |
| 5,403,048 A | * | 4/1995 | Ekladyous et al. | 293/115 |
| 5,658,041 A | * | 8/1997 | Girardot et al. | 296/193.09 |
| 6,155,633 A | * | 12/2000 | Minami et al. | 296/193.09 |
| 6,921,117 B2 | * | 7/2005 | Rackham et al. | 293/115 |
| 7,144,055 B2 | * | 12/2006 | Kimura et al. | 293/133 |
| 7,152,916 B2 | * | 12/2006 | Roussel | 296/203.02 |
| 7,325,861 B2 | * | 2/2008 | Zacheiss et al. | 296/187.09 |
| 2007/0144851 A1 | * | 6/2007 | Ginja et al. | 188/377 |
| 2007/0176441 A1 | * | 8/2007 | Lau et al. | 293/115 |
| 2007/0182174 A1 | * | 8/2007 | Nakayama et al. | 293/115 |

* cited by examiner

*Primary Examiner*—H Gutman
(74) *Attorney, Agent, or Firm*—Ralph E. Smith

(57) ABSTRACT

A front bumper system for a motor vehicle including a body and a front end module includes a beam coupled to the body and an energy absorbing cover coupled to the beam. The front bumper system also includes a grille coupled to the cover and covering at least a portion of the front end module. The grille can define a plurality of openings sized to at least partially restrict objects from contacting the front end module.

12 Claims, 3 Drawing Sheets

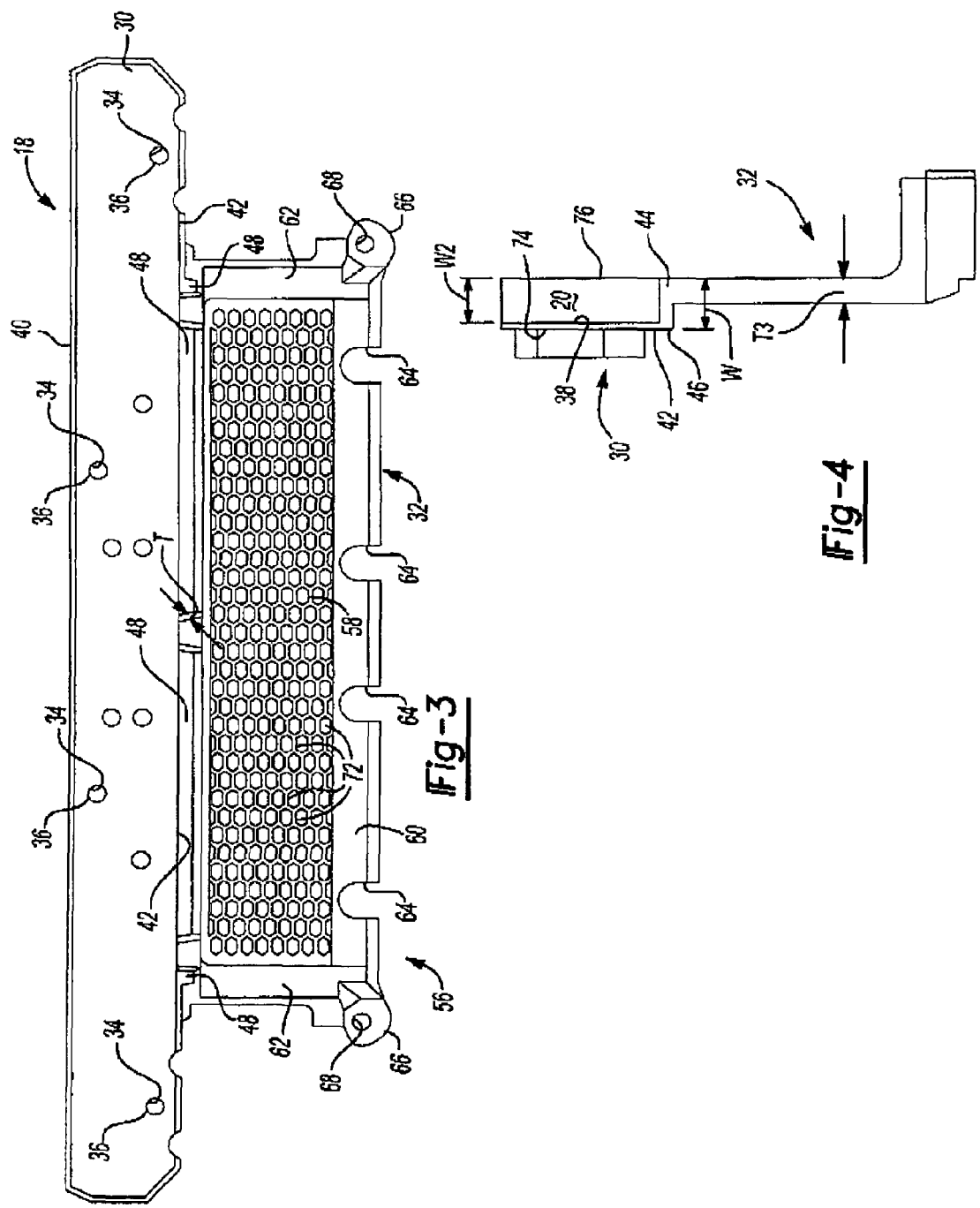

FRONT BUMPER ENERGY ABSORBER WITH INTEGRATED DEBRIS GRILLE

FIELD

The present invention relates generally to energy absorbing systems, and more particularly to a front bumper energy absorber with an integrated debris grille.

BACKGROUND

The statements in this section merely provide background information related to the present disclosure and may not constitute prior art.

Generally, many motor vehicles employ front bumper systems that can withstand low speed impacts. Typically, these front bumper systems include a bumper beam and a bumper fascia coupled to the beam. During a low speed impact, the interior of the bumper fascia can become damaged from contact with the bumper beam. In addition, most motor vehicles do not provide a debris grill in front of the radiator or front end module. In many instances, debris damages the radiator or front end module causing costly repairs.

Accordingly, it is desirable to provide a front bumper energy absorber with an integrated debris grille.

SUMMARY

A front bumper system for a motor vehicle, which includes a body and a front end module, has a beam coupled to the body and an energy absorbing cover coupled to the beam. A grille is coupled to the cover and covers at least a portion of the front end module. The grille defines a plurality of openings sized to at least partially restrict objects from contacting the front end module.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present invention will become more fully understood from the detailed description and the accompanying drawings, wherein:

FIG. 3 is a front view of the front bumper energy absorber with an integrated debris grille of FIG. 1; and FIG. 4 is a partial side view of the front bumper energy absorber with an integrated debris grille of FIG. 1 coupled to a beam as shown along line 4-4 of FIG. 1.

DETAILED DESCRIPTION

The following description is merely exemplary in nature and is not intended to limit the present disclosure, application, or uses. Although the following description is related generally to a front bumper energy absorber with an integrated debris grille for a mobile platform, such as a motor vehicle, it will be understood that the front bumper system, as described and claimed herein, is used with any appropriate application. Therefore, it will be understood that the following discussions are not intended to limit the scope of the appended claims.

Figure 1:
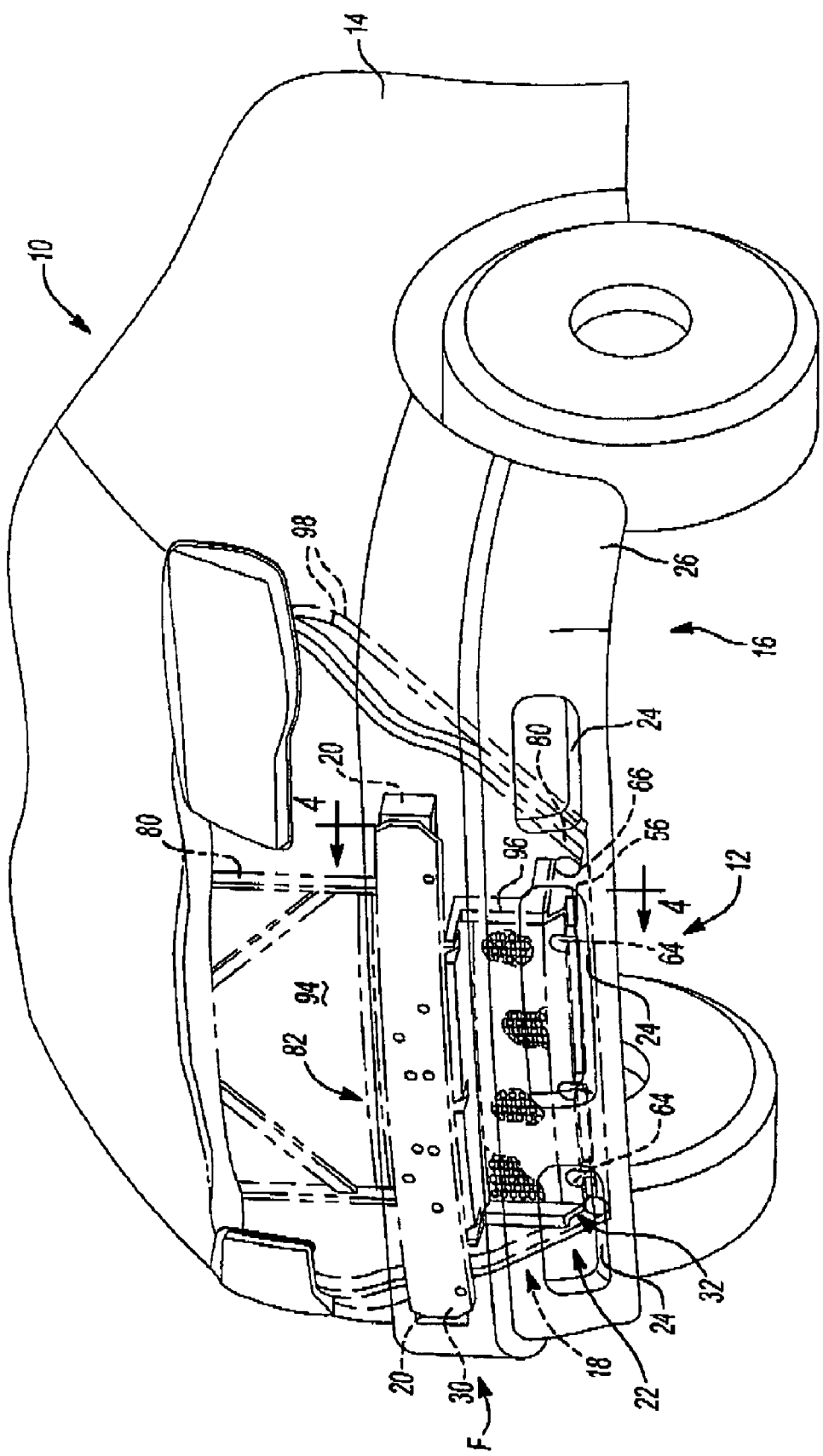
FIG. 1 is a perspective view of an exemplary motor vehicle employing a front bumper energy absorber with an integrated debris grille according to the principles of the present invention.

With reference to FIG. 1, a motor vehicle 10 is shown including a front bumper system 12 coupled to a body 14. In addition, the term "body" as described herein is used to denote the traditional frame and body or a uniform motor vehicle body. The front bumper system 12 includes a bumper fascia 16, an energy absorbing debris grille 18, a beam 20 and a front end module 22.

The bumper fascia 16 is generally coupled to the body 14, or is coupled to the front end module 22. Generally, the bumper fascia 16 is formed of a polymeric material, such as polypropylene (PP) or thermoplastic-olefin elastomers (TEO) however, various other materials could be employed, along with fiber reinforcement, such as glass reinforcement, if desired. The bumper fascia 16 is molded into any desired shape, such as arcuate or semi-elliptical, but it will be understood that the bumper fascia 16 could be formed into any desired shape as required for the particular mobile vehicle 10. The bumper fascia 16 defines at least one or a plurality of openings 24 therein to enable air to flow into the front end module 22, as will be discussed in greater detail herein. The bumper fascia 16 also generally defines an outer surface 26 and an inner surface (not specifically shown). The inner surface 28 is disposed adjacent to the energy absorbing debris grille 18 (not specifically shown).

Figure 2:
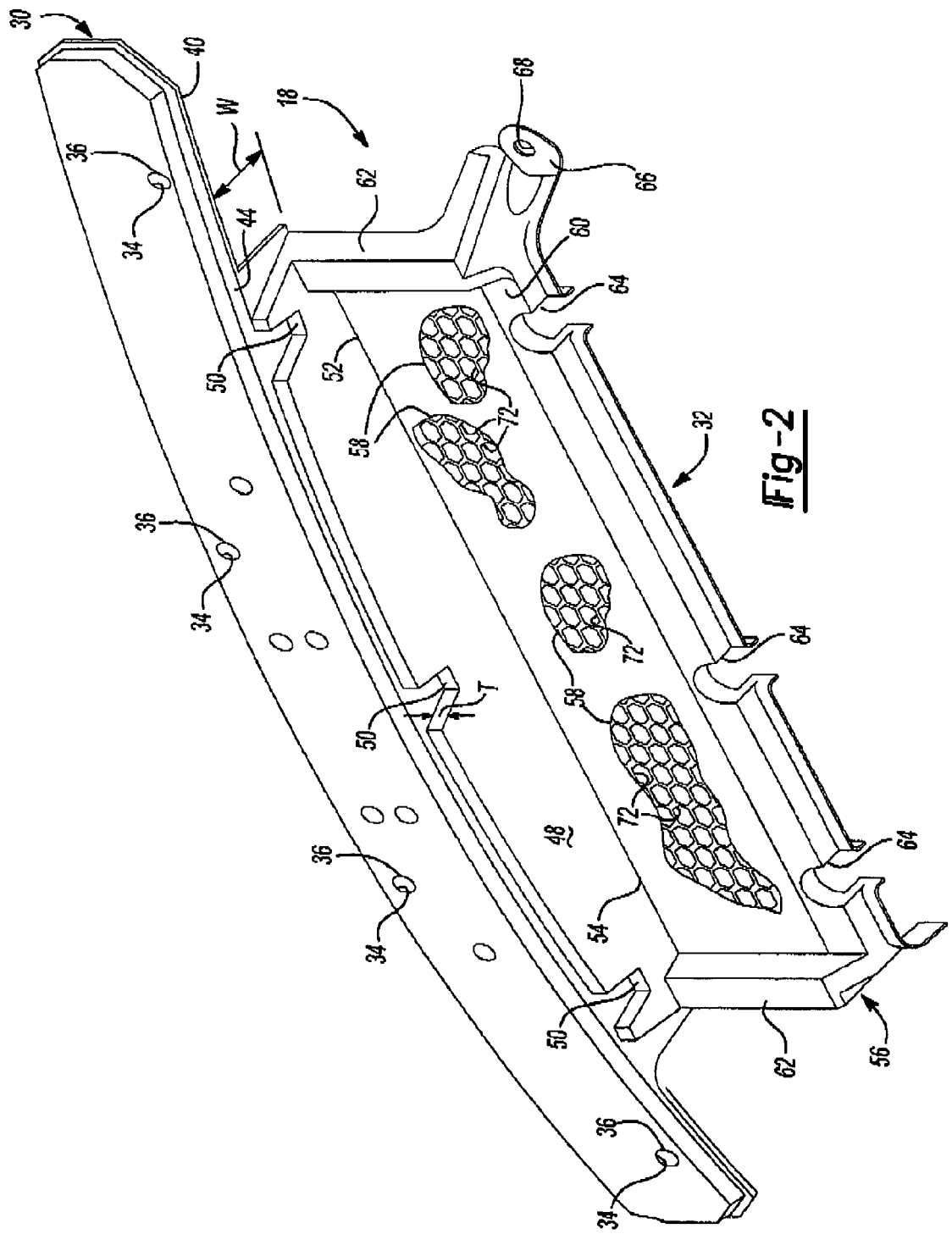
FIG. 2 is a perspective view of the front bumper energy absorber with an integrated debris grille of FIG. 1.

With reference to FIGS. 2 and 3, the energy absorbing debris grille 18 includes an energy absorbing cover 30 coupled to a grille or screen assembly 32. The energy absorbing debris grille 18 is formed of any desirable material, such as PP and TEO, but other materials having similar properties could be used. Typically, the cover 30 is integrally formed with the screen assembly 32 through any appropriate process, such as injection molding.

The cover 30 generally serves to absorb energy or force F, which is generated from a low speed collision. The cover 30 generally extends for a substantial length of the beam 20, but the cover 30 could be any other desired length. The cover 30 generally acts as a buffer between the bumper fascia 16 and the beam 20 to reduce the likelihood of deformation of the beam 20 upon application of the force F. Thus, the cover 30 also protects the inner surface 28 of the bumper fascia 16 from damage by reducing the chance for sharp edges (not shown), which results from deformation of the beam 20. The cover 30 defines at least one or a plurality of apertures 34 for receipt of fasteners to couple the cover 30 to the beam 20.

The cover 30 further includes a first side 38 and a second side 40. The first side 38 is generally disposed adjacent to the inner surface 28 of the bumper fascia 16. It should be noted that the first side 38 also includes at least one raised additional energy absorbing feature (not specifically shown). An example of a suitable additional energy absorbing feature is found in U.S. Pat. No. 6,575,510, assigned to Shape Corporation, and incorporated herein by reference in its entirety. The second side 40 of the cover 30 is configured to mate with the beam 20 (not specifically shown). The cover 30 also includes an end 42, which couples the cover 30 to the screen assembly 32, as shown best in FIG. 4.

The screen assembly 32 includes a lip 44, which includes a first end 46 coupled to the end 42 of the cover 30 (FIG. 4). The lip 44 is any desired shape, but generally has a width W that is approximately equivalent to a width W2 of the beam 20 (FIG. 4). The lip 44 is generally planar, but may include an area 48 with an increased thickness T for rigidity (FIG. 3).

The lip 44 also includes at least one or a plurality of notches 50. The notches 50 acts to keep the energy absorbing cover 30 tight around a bottom of the beam 20. The lip 44 also includes a second end 52, which is coupled to a first end 54 of a frame 56. The frame 56 provides a support structure for a screen 58.

The frame 56 generally includes the first end 54 coupled to the lip 44, a second end 60 and a plurality of sides 62. The first end 54, second end 60 and sides 62 generally form a rectangular shape; however, the shape of the frame 56 is modified according to the front end module 22 as will be described in greater detail below. The second end 60 defines at least one or a plurality of cavities 64. The cavities 64 are generally U-shaped to enable an assembly operator to insert a fastening tool (not shown) and a fastener (not shown) to couple the front end module 22 to the body 14. The sides 62 of the frame 56 generally have a thickness T3 to provide stability and rigidity to the frame 56 (FIG. 4). At least one or a plurality of arms 66 is coupled to or forms an intersection of the second end 60 and the sides 62. Each of the arms 66 defines an aperture 68 for receipt of a fastener to couple the second end 60 of the frame 56 of the screen assembly 32 to the front end module 22 (not specifically shown). It should be noted, however, that the second end 60 of the frame 56 could be coupled to the front end module 22 through any appropriate technique, such as through welding or adhesives.

The screen 58 is integrally formed between the first end 54, the second end 60 and the sides 62. Generally, the screen 58 is integrally formed with the first end 54, the second end 60 and the sides 62. The screen 58 defines a plurality of apertures 72. The apertures 72 are hexagonal in shape, but the apertures 72 could also be octagonal or any other shape. Generally, the apertures 72 forms a honeycomb pattern, but any other configuration could be used. The apertures 72 are spaced a desired distance apart; however, it should be noted that depending on the bumper fascia 16 and the front end module 22, the apertures 72 could be spaced a larger or smaller distance apart. It should be noted that although the screen 58 is described herein as being integrally formed with the frame 56, the screen 58 could be a conventional wire mesh screen, which is coupled to the frame 56 via mechanical fasteners and the like.

The beam 20 is coupled to the body 14 and includes a first side 74 and a second side 76. The first side 74 of the beam 20 defines at least one or a plurality of apertures (not specifically shown) for receipt of the fasteners 36 to couple the cover 30 to the beam 20 and the second side 76 is generally substantially planar to the screen assembly 32. The beam 20 is composed of a metallic material, such as steel or steel alloys, but could also be composed of magnesium, aluminum or plastic composites. The second side 76 of the beam 20 is generally adjacent to the front end module 22.

The front end module 22 generally provides an interface between a drivetrain (not specifically shown) and a vehicle body (not specifically shown) of the motor vehicle 10. Given that the front end module 22 is configured to contain a variety of components, such as a heating and cooling system and other components typically found in the front end of a motor vehicle, only a few of these components will be discussed herein. It will be understood, however, that the front end module 22 could contain any of the numerous components listed above, or additional components depending on the manufacturer's specifications.

With reference to FIG. 1, the front end module 22 includes a support structure 80, and a cooling system 82 coupled to and disposed in the support structure 80. The support structure 80 defines at least one or a plurality of apertures therein (not shown) for receipt of a fastener to couple the support structure 80 to the body 14. The support structure 80 further defines at least one or a plurality of apertures (not shown) for receipt of the fastener to couple the screen assembly 32 to the front end module 22. The fastener is inserted through the arms 66 of the frame 56 of the screen assembly 32 to couple the screen assembly 32 and, thus, the energy absorbing debris grille 18, to the front end module 22. The support structure 80 defines an opening 94 for receipt of the cooling system 82.

As is generally known, the cooling system 82 includes a radiator 96 coupled to a plurality of coolant lines 98 to receive a coolant from a coolant reservoir (not shown) and a coolant pump (not shown) for supplying the coolant. The radiator 96 is operable to cool the drivetrain (not shown). The radiator 96 is generally positioned in the support structure 80 so that the radiator 96 receives air through the openings 24 of the bumper fascia 16 to cool the coolant in the radiator 96. The radiator 96 is coupled to the support structure 80 through any appropriate technique, such as mechanical fasteners or welding. The radiator 96 generally extends for a desired length within the support structure 80, and the screen assembly 32 is generally disposed over at least one-third to one-half the desired length of the radiator 96, which is generally equivalent or slightly larger than a length of the openings 24 of the bumper fascia 16 (not specifically shown). Thus, the screen assembly 32 of the energy absorbing debris grille 18 serves to protect an exposed area of the radiator 96 from debris or particles that could enter through the openings 24 of the bumper fascia 16.

In order to assemble the front bumper system 12, the energy absorbing debris grille 18 is coupled to the front end module 22 and beam 20 after the front end module 22 is assembled with the radiator 96 of the cooling system 82 and other desired components. It should be noted that the following description is for illustration only, and the front bumper system 12 could be assembled in any desired order. Generally, the first side 38 of the cover 30 is coupled to the first side 74 of the beam 20 by inserting the fasteners 36 through the apertures 34 of the cover 30 and into the apertures of the beam 20 (not specifically shown). Next, the fasteners 70 are inserted through the apertures 68 defined in the arms 66 and into the apertures 92 defined in the support structure 80 to couple the screen assembly 32 to the front end module 22. Next, the front end module 22 is coupled to the body 14. Typically, an assembly operator inserts a fastening tool through the U-shaped cavities 64 to couple the front end module 22 to the body 14 via a fastener. Then, the bumper fascia 16 is disposed around the energy absorbing debris grille 18 and front end module 22 and coupled to the body 14 to complete the assembly process.

When the motor vehicle 10 is in operation, debris entering the openings 24 in the bumper fascia 16 is prevented from contacting the radiator 96 of the cooling system 82 by the honeycombed screen 58. If, during operation, the motor vehicle 10 is subjected to the force F of a low speed collision, the cover 30 absorbs the force F of the collision to prevent damage to the beam 20 and bumper fascia 16.

The description of these teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A front bumper system for a motor vehicle including a body and a front end module, the front bumper system comprising:

a beam adapted to be coupled to the body;

an energy absorbing cover coupled to the beam;

a grille coupled to the cover and covering at least a portion of the front end module, the grille defining a plurality of openings sized to restrict debris from contacting the front end module; and a bumper fascia disposed around at least the energy absorbing cover and a portion of the grille;

wherein the cover is responsive to a force to deform without damaging the bumper fascia; and wherein the grille further includes a lip adapted to couple the energy absorbing cover to the grille, the lip having a thickness substantially equivalent to a thickness of the beam.

2. The front bumper system of claim 1, wherein the energy absorbing cover is integrally formed with the grille.

3. The front bumper system of claim 2, wherein the energy absorbing cover and grille are injection molded from polypropylene (PP) or thermoplastic-alarm elastomers (TEO).

4. The front bumper system of claim 1, wherein the grille further comprises at least one opening adapted to enable the front end module to be coupled to the body.

5. The front bumper system of claim 1, wherein the front end module Includes a cooling system, the grille covering at least a portion of the cooling system.

6. A motor vehicle comprising:
a body;
a front end module coupled to the body;
a beam mounted to at least one of the front end module and the body;
a cover coupled to the beam to cover the beam; and
a screen coupled to the front end module and the cover, the screen operable to prevent particles from entering the front end module;
wherein the screen further includes a lip adapted to couple the cover to the screen, the lip having a thickness substantially equivalent to a thickness of the beam.

7. The motor vehicle of claim 6, wherein the cover is integrally formed with the screen.

8. The motor vehicle of claim 7, wherein the cover and screen are injection molded from polypropylene (PP) or thermoplastic-olefin elastomers (TEO).

9. The motor vehicle of claim 6, further comprising:
a bumper fascia disposed around at least the cover and a portion of the screen,
wherein the cover is responsive to a force to deform without damaging the bumper fascia.

10. The motor vehicle of claim 6, wherein the front end module includes a cooling system, the screen covering at least a portion of the cooling system.

11. A motor vehicle comprising:
a body;
a front end module including a cooling system the front end module coupled to the body;
a beam mounted to at least one of the front end module and the body;
a cover coupled to the beam;
a screen extending from the cover, the screen coupled to the front end module, the screen covering at least a portion of the cooling system;
a bumper fascia disposed around at least the cover and a portion of the screen,
wherein the cover is responsive to a force to deform without damaging the bumper fascia; and
wherein the screen further includes a lip adapted to couple the cover to the screen, the lip having a thickness substantially equivalent to a thickness of the beam.

12. The motor vehicle of claim 11, wherein the cover and screen are Injection molded from polypropylene (PP) or thermoplastic-olefin elastomers (TEO).

\* \* \* \* \*